(12) United States Patent
Kim (10) Patent No.: US 7,068,337 B2
(45) Date of Patent: Jun. 27, 2006

(54) APPARATUS FOR INSPECTING LIQUID CRYSTAL PANEL

(75) Inventor: Dae You Kim, Chungcheongnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 13 days.

(21) Appl. No.: 10/698,486

(22) Filed: Nov. 3, 2003

(65) Prior Publication Data

US 2004/0090585 A1    May 13, 2004

(30) Foreign Application Priority Data

Nov. 4, 2002    (KR) .................. 10-2002-0067777

(51) Int. Cl.
   *G02F 1/1345*    (2006.01)

(52) U.S. Cl. ...................... 349/149; 349/150

(58) Field of Classification Search ........... 349/149, 349/150, 151, 152
   See application file for complete search history.

(56) References Cited

U.S. PATENT DOCUMENTS 6,411,359 B1 *    6/2002    Kobayashi et al. ......... 349/149
6,583,844 B1 *    6/2003    Mishima et al. ............. 349/149

FOREIGN PATENT DOCUMENTS

| JP | 6-044907 | 2/1994 |
| JP | 9-231907 | 9/1997 |
| JP | 2000-223033 | 8/2000 |

* cited by examiner

*Primary Examiner*—Andrew Schechter
*Assistant Examiner*—David Chung
(74) *Attorney, Agent, or Firm*—McKenna Long & Aldridge LLP (57) ABSTRACT

The present invention relates to an apparatus for inspecting a liquid crystal panel capable of coping with a fine pitch and reducing an inspection time.

The inspecting apparatus of the present invention comprises an integrated circuit board; a tape carrier package fixedly connected to the integrated circuit board; and a connector having a first pads fixedly connected to the tape carrier package and a second pads connected to the liquid crystal panel.

12 Claims, 9 Drawing Sheets

APPARATUS FOR INSPECTING LIQUID CRYSTAL PANEL

This application claims the benefit of Korean Patent Application No. 10-2002-67777, filed on Nov. 4, 2002, which is hereby incorporated by reference for all purposes as if fully set forth herein.

BACKGROUND OF THE INVENTION

1. Field of the Invention

The present invention relates to an apparatus for inspecting a liquid crystal panel, and more particularly to the apparatus for inspecting the liquid crystal panel capable of handling a fine pitch and reducing inspection time.

2. Discussion of the Related Art

In general, a liquid crystal display produces a picture by means of adjusting a light transmittance of a liquid crystal using an electric field. For this purpose, the liquid crystal display comprises a liquid crystal panel where liquid crystal cells are arranged in a matrix pattern and a driving circuit for driving this liquid crystal panel.

In a liquid crystal panel, gate lines and data lines are arranged perpendicularly and liquid crystal cells are located in the region where gate lines and data lines intersect. The liquid crystal panel is provided with pixel electrodes and common electrodes for applying an electric field to the respective liquid crystal cells in this liquid crystal panel. Each of the pixel electrodes are connected to a data line through a source and a drain electrode of a thin film transistor, which is used as a switching apparatus. The gate terminal of the thin film transistor is connected to one of the gate lines on which a video signal is applied to pixel electrodes.

The driving circuit comprises a gate driver to drive the gate lines, a data driver to drive the data lines, a timing controller to control the gate driver and the data driver and the power supply to supply various driving voltages used in the liquid crystal display. The timing controller controls a driving time of the gate driver and the data driver and in addition supplies pixel data to the data driver.

The power supply generates the driving voltages such as a common voltage (Vcom), a gate high voltage (Vgh), a gate low voltage (Vgl) as necessary to drive the liquid crystal display. The gate driver sequentially supplies a scanning signal to the gate lines to sequentially drive liquid crystal cells on the liquid crystal panel one line at a time. The data driver generates a video signal by using a pixel data and supplies the generated video signal to each data lines whenever a scanning signal is supplied to any one of the gate lines. Hereby, the liquid crystal display represents the picture by means of adjusting for each liquid crystal cell the light transmittance using the electric field applied between the pixel electrode and the common electrode in accordance with the video signal.

The data driver and the gate driver that are directly connected to the liquid crystal panel are integrated into a plurality of integrated circuits (IC). Each of the integrated data driver ICs and the gate driver ICs are mounted on a TCP (Tape Carrier Package) and then are connected to the liquid crystal panel using a TAB (Tape Automated Bonding) system or are mounted on the liquid crystal panel using a COG (Chip On Glass) system.

Herein, the drive ICs connected to the liquid crystal panel by the TAB system through the TCP receive control signals and DC voltages from a PCB (Printed Circuit Board, that is, the timing controller and the power supply) connected to the TCP.

The drive ICs mounted in the liquid crystal panel by the COG system are connected to each other by a LOG (Line On Glass) system where the signal lines are mounted on the liquid crystal panel, that is, a lower glass, and in addition receive the control signals and the driving voltages from the timing controller and the power supply.

Before the TCP is connected to the liquid crystal panel, bad pixels of the liquid crystal panel are inspected by using an inspecting apparatus (such as an auto probe). More specifically, after the liquid crystal panel is finished, each bad pixel of the liquid crystal panel is checked and a reliable liquid crystal panel is provided by means of repairing the checked bad pixels. Afterwards, the liquid crystal panel is connected to the TCP.

Figure 1:
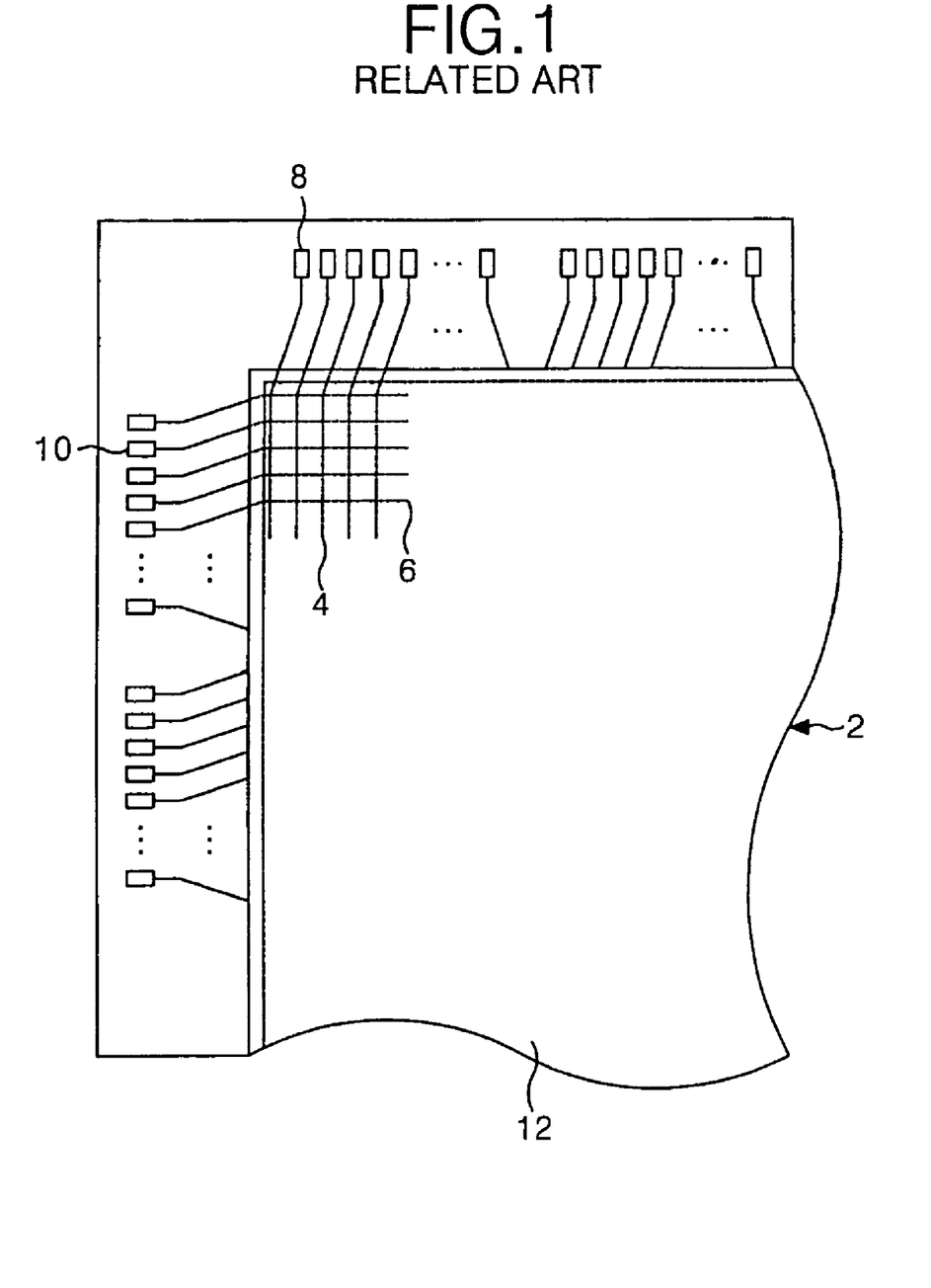
FIG. 1 is a plan view illustrating a liquid crystal panel schematically.

As shown in FIG. 1, before being connected to the TCP, the liquid crystal display comprises a liquid crystal panel 2 and pads 8 and 10 formed in the upper and the left ends of the liquid crystal panel 2. The liquid crystal panel 2 includes liquid crystal between an upper substrate and a lower substrate. A thin film transistor array is formed together with various signal lines on the lower substrate, and a color filer array is formed on the upper substrate. The liquid crystal panel 2 includes a liquid crystal cell provided at intersections of gate lines 6 and data lines 4 to define a picture display region 12 for displaying the picture.

In an external region of the lower substrate located in the external part of the picture display region 12, data pads 8 extending from the data line 4 and gate pads 10 extending from the gate line 6 are located. After the liquid crystal panel 2 is completed, the bad pixels of the liquid crystal panel 2 are checked by using an apparatus for inspecting the liquid crystal panel 14.

Figure 2:
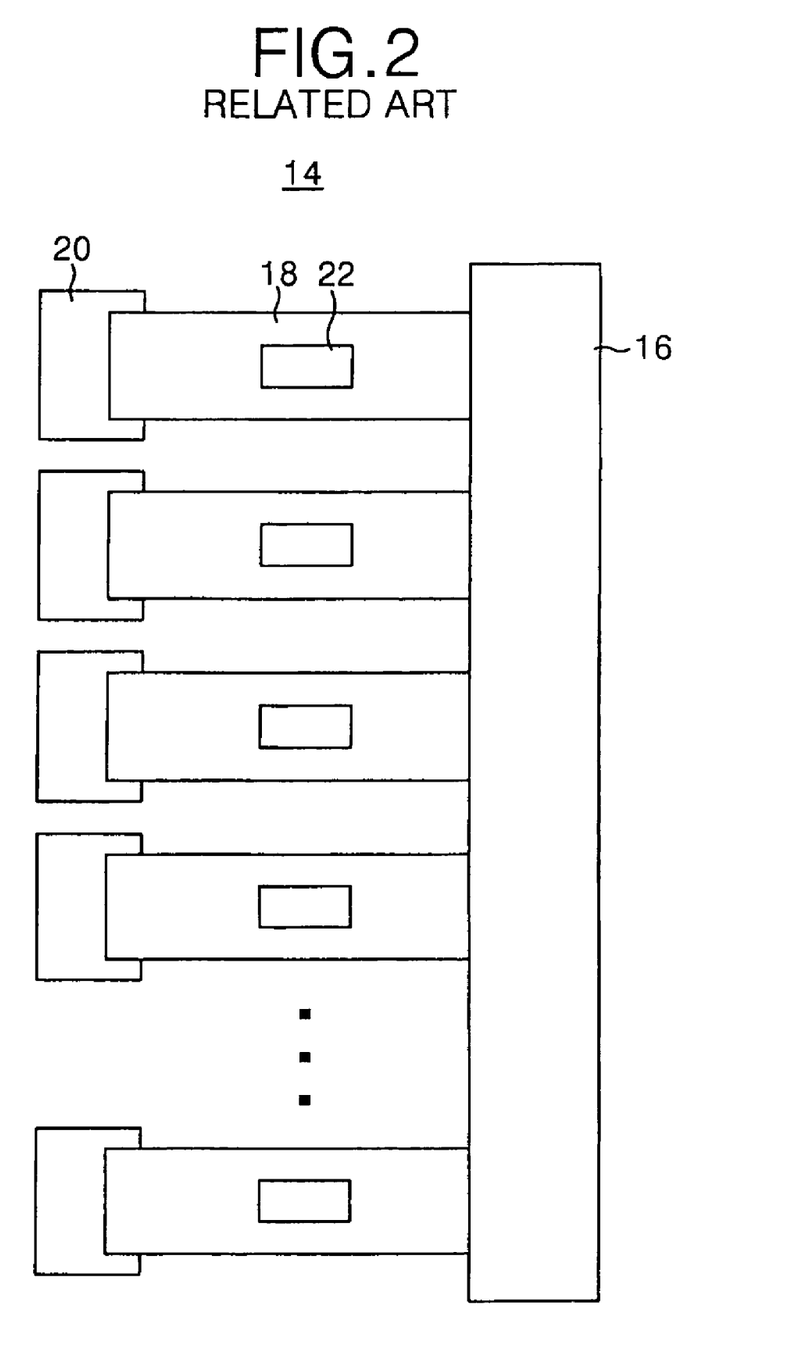
FIG. 2 is a plan view illustrating a conventional apparatus for inspecting a liquid crystal panel.

Referring to FIG. 2, the conventional apparatus for inspecting the liquid crystal panel comprises a PCB 16, a TCP 18 and a connector 20.

The timing controller and the power supply are mounted in the PCB 16. The timing controller and the power supply generate control signals and DC voltage. The PCB 16 is fixed by a supporting member (not shown).

One side of the TCP 18 is electrically connected to the PCB 16. A drive IC 22 is mounted on each TCP 18. The drive IC 22 generates a driving signal supplied to the data pad 8 and the gate pad 10 using the control signals and the DC voltage supplied from the PCB 16. The driving signal generated by the drive IC 22 of the TCP 18 is supplied to the data pad 8 or the gate pad 10 and in turn to the gate lines 6 and the data lines 4.

The connector 20 supplies the driving signals supplied from the TCP 18 to the pads 8 and 10. For this purpose, the one side of the connector 20 is connected so that it may be fixed to the other side of the TCP 18. Namely, the connector 20 is electrically connected to the pads of the TCP 18 (not shown).

Figure 3:
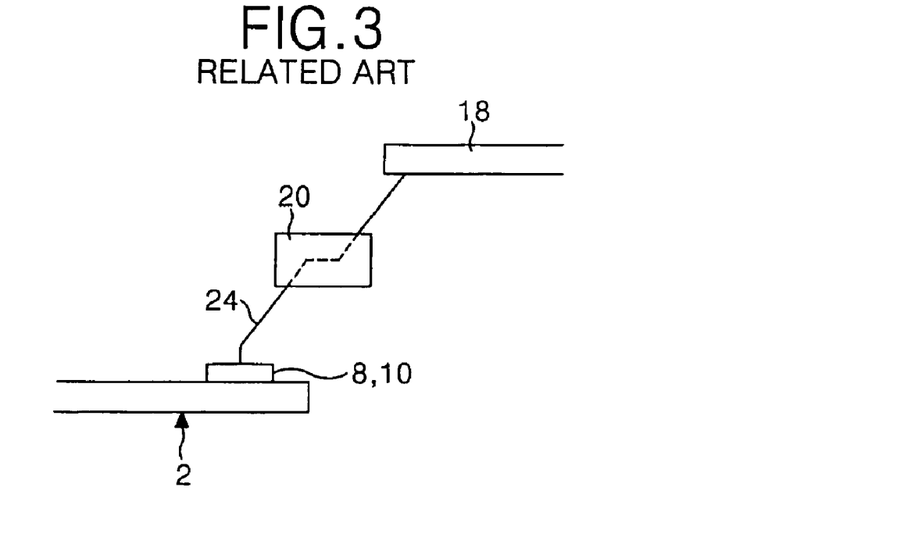
FIGS. 3 and 4a are diagrams illustrating where a liquid crystal panel shown in FIG. 2 contacts an inspecting apparatus.
Figure 4A:
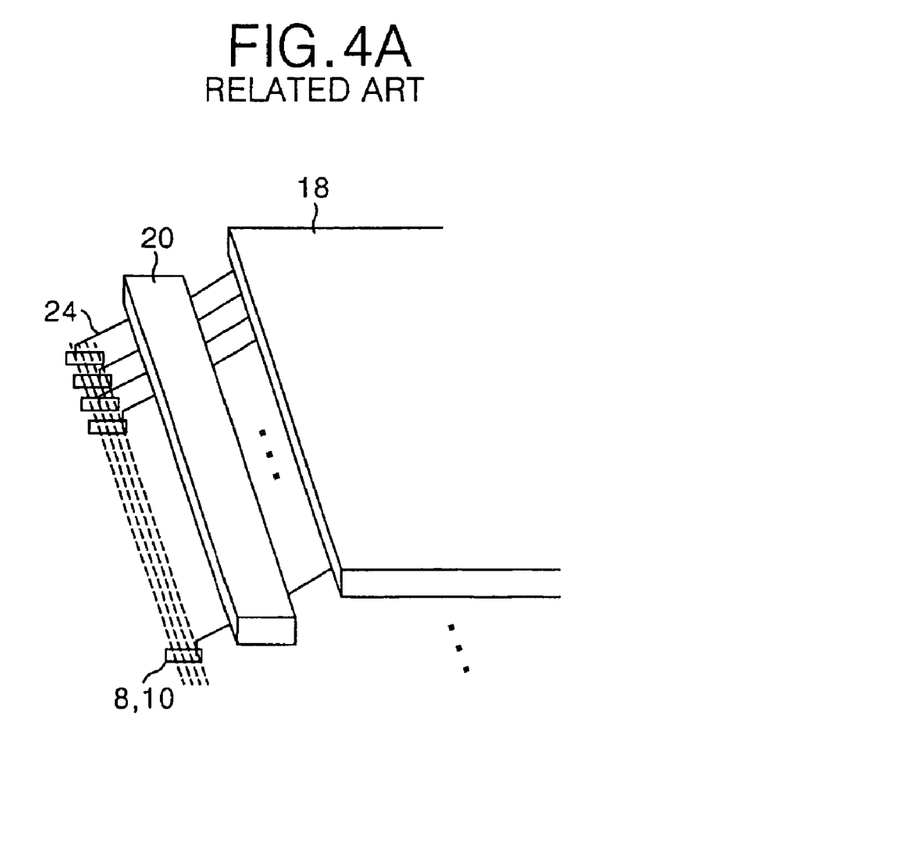

On the other hand, the connector 20 comprises a plurality of pins 24 as shown in FIGS. 3 and 4a. The pins 24 are fixed to the connector 20 to supply the driving signal from the TCP 18 to the pads 8 and 10. More specifically, the pins 24 are set up between pads (not shown) of the TCP 18 and the pads 8 and 10 of the liquid crystal panel 2 and electrically connect the pad of the TCP 18 and the pads 8 and 10 of the liquid crystal panel 2.

In accordance with the present invention, the pins 24 are arranged in four columns in order to prevent a short circuit with adjacent pins 24. More specifically, as shown in FIG.

Figure 4B:
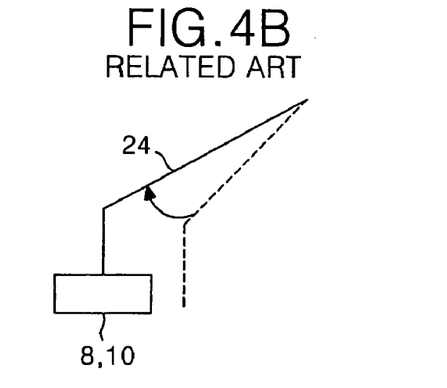
FIG. 4b is a diagram illustrating an elastic force of a pin when a liquid crystal panel is contacted with an apparatus for inspecting a liquid crystal panel.

4a, the pins are alternately arranged in order to locate in each other different column with adjacent pins 24. And, as shown in FIG. 4b, the pins 24 are adhered to the pads 8 and 10 with a predetermined elastic force. After the pins 24 are connected to the pads 8 and 10, the apparatus 14 for inspecting the liquid crystal, that is, the TCP 18, inspects bad pixels of the liquid crystal panel 2 by providing a designated pattern signal and a signal turning the device on and off.

As described above, the conventional apparatus for inspecting a liquid crystal panel 14 is electrically connected to the pads 8 and 10 of the liquid crystal panel 2 by using a plurality of pins 24. Here, since each of pins 24 has a protrusion at its end for contact, a bending of the pins 24 can occur during fabrication. For example, since the pins 24 can be bent if they catch on the clothes or gloves of an operator, it is difficult to inspect exactly. In addition, since the pins 24 are arranged in 4 rows, it is difficult to find which particular pin is bent. Further, a short circuit may arise if a material falls between the pins 24. And in order to combine a plurality of pins 24 with the desired pads 8,10, much fabrication time is needed. In particular, the finer the pitch of the pads of the liquid crystal panel 2 the more this phenomena arises.

SUMMARY OF THE INVENTION

Accordingly, the present invention is directed to an apparatus for inspecting the liquid crystal panel in order to reduce inspection time and in addition to cope with a fine pitch that substantially obviates one or more of the problems due to limitations and disadvantages of the related art.

An advantage of the present invention is to provide a connector that has a first alignment mark for arranging the liquid crystal panel with the connector so that the second pads may be exactly connected to liquid crystal pads formed in the liquid crystal panel.

Another advantage of the present invention is to provide a second alignment mark that is formed in the liquid crystal panel in order to correspond to the first align mark formed in the connector.

Another advantage of the present invention is to provide a pressure bar for applying a designated pressure to the connector so that the second pads may be completely adhered to the liquid crystal pad.

Another advantage of the present invention is to provide the first pads that are formed on a first surface of the connector, and the second pads are formed in a second surface opposite to the first surface.

Another advantage of the present invention is to provide the first and the second pads formed in a same surface.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a inspecting apparatus of the liquid crystal according to an aspect of the present invention includes an integrated circuit board; a tape carrier package fixedly connected to the integrated circuit board; and a connector having first pads fixedly connected to the tape carrier package and second pads connected to the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 5:
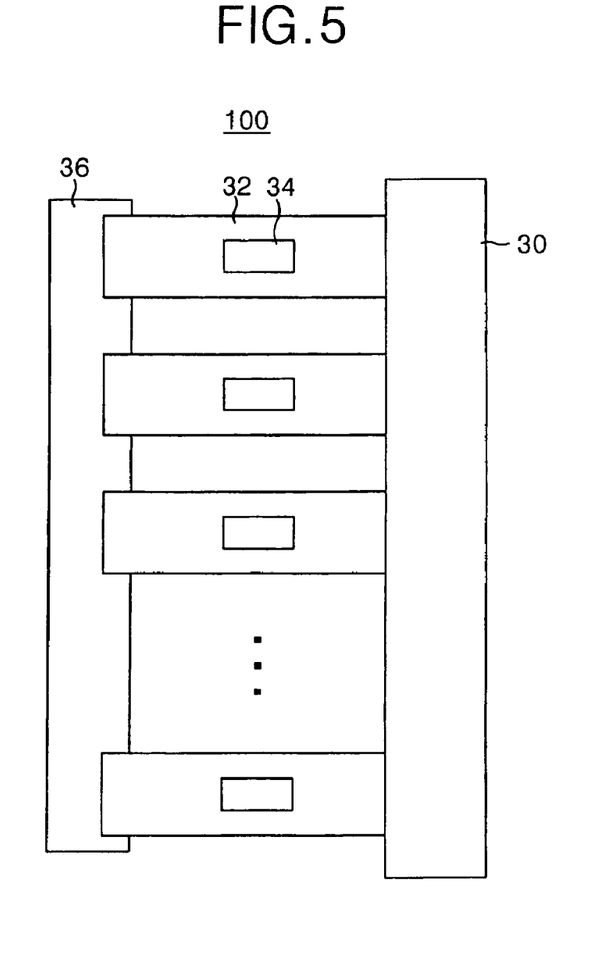
FIG. 5 is a diagram illustrating an apparatus for inspecting a liquid crystal panel according to an embodiment of the present invention.

FIG. 5 is a diagram illustrating an apparatus for inspecting a liquid crystal panel according to an embodiment of the present invention.

In FIG. 5, the inspecting apparatus 100 for the liquid crystal panel according to an embodiment of the present invention includes a PCB 30, TCP 32 and a connector 36.

The timing controller and the power supply are mounted on the PCB 30. The timing controller mounted on the PCB 30 generates control signals. The power supply mounted on the PCB 30 generates a DC voltage. The PCB 30 may be fixed by a supporter or the like (not shown).

The TCP 32 connected between the PCB 30 and the connector 36 is electrically connected to the PCB 30. The drive IC 34 is mounted on each TCP 32. The drive IC 34 generates the driving signal supplied to pads of the liquid crystal panel by using the control signals and the DC voltage supplied from the PCB 30. In fact, the drive IC 34 generates an on/off signal and a designated pattern driving signal and supplies the on/off signal and the pattern driving signal to the pads of the liquid crystal panel.

Figure 6:
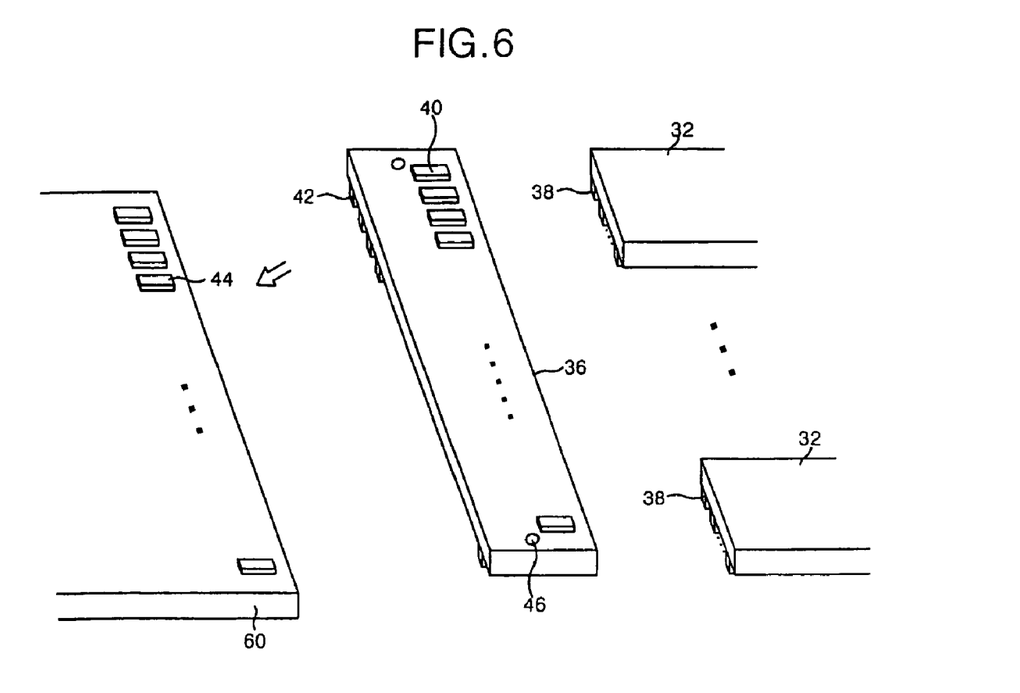
FIG. 6 is a diagram illustrating a contact process between a connector and a liquid crystal panel shown in FIG. 5.

The connector 36 is connected fixedly to the TCP 32. The connector 36 supplies the driving signal supplied from the TCP 32 to the pads of the liquid crystal panel. For this purpose, as shown in FIG. 6, a first pad 40 of the connector 36 is connected to the TCP pad 38, and a second pad 42 of the connector 36 is connected to the pads 44 of the liquid crystal panel 60. In FIG. 6, the connector 36 and the TCP 32 are illustrated as being connected to test equipment in order to illustrate connector 36 and the pads 40 and 38 of the TCP 32.

In the present invention, the connector 36 includes first pads 40 and second pads 42 on opposite sides of the connector 36. The first pads 40 are connected to the TCP pad 38 and are supplied with the driving signal supplied from the TCP 32. The second pads 42 located on a surface of the connector 36 opposite the surface having the first pads 40 deliver the driving signal supplied from the first pad 40 to the pads 44 of the liquid crystal panel 60.

On the other hand, at least one of an alignment mark 46 is formed in the connector 36. The alignment mark 46 is used when the inspecting apparatus 100 for testing the liquid crystal panel is connected to the liquid crystal panel 60. In other words, when the connector 36 is connected to the pads 44 of the liquid crystal panel 60, both the second pad 42 and the pads 44 of the liquid crystal panel 60 are quickly and precisely connected by using the alignment mark 46. On the other hand, the liquid crystal panel 60 may have an alignment mark (not shown) corresponding to the alignment mark 46 of the connector 36.

In the present invention, the connector 36 connects inspecting apparatus 100 for testing the liquid crystal panel and the liquid crystal panel 60 using the second pads 42. At this time, the inspecting apparatus 100 and the liquid crystal panel 60 can be connected exactly without an error by using the alignment mark 46. In addition, in the present invention, the problem that the bending of the pin during the fabrication process is overcome. In addition, since the inspecting apparatus 100 and the liquid crystal panel 60 can be connected within a short period of time, the overall fabrication time can be reduced. Accordingly, the inspecting apparatus 100 of the present invention can also inspect bad pixels without error in liquid crystal panels having a fine pitch.

Figure 7A:
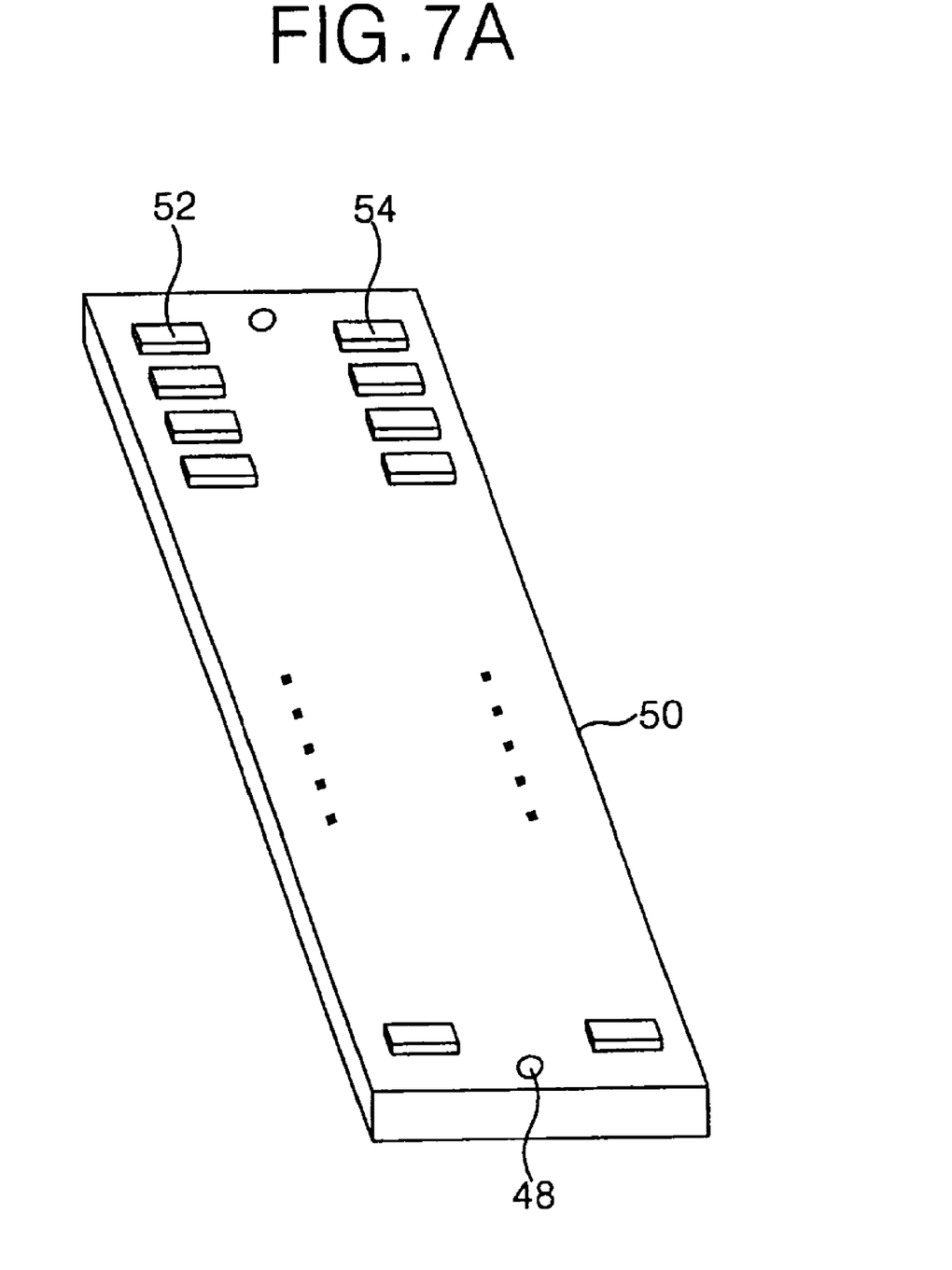
FIG. 7a is a diagram illustrating a connector of an apparatus for inspecting the liquid crystal panel according to an other embodiment of the present invention.
Figure 7B:
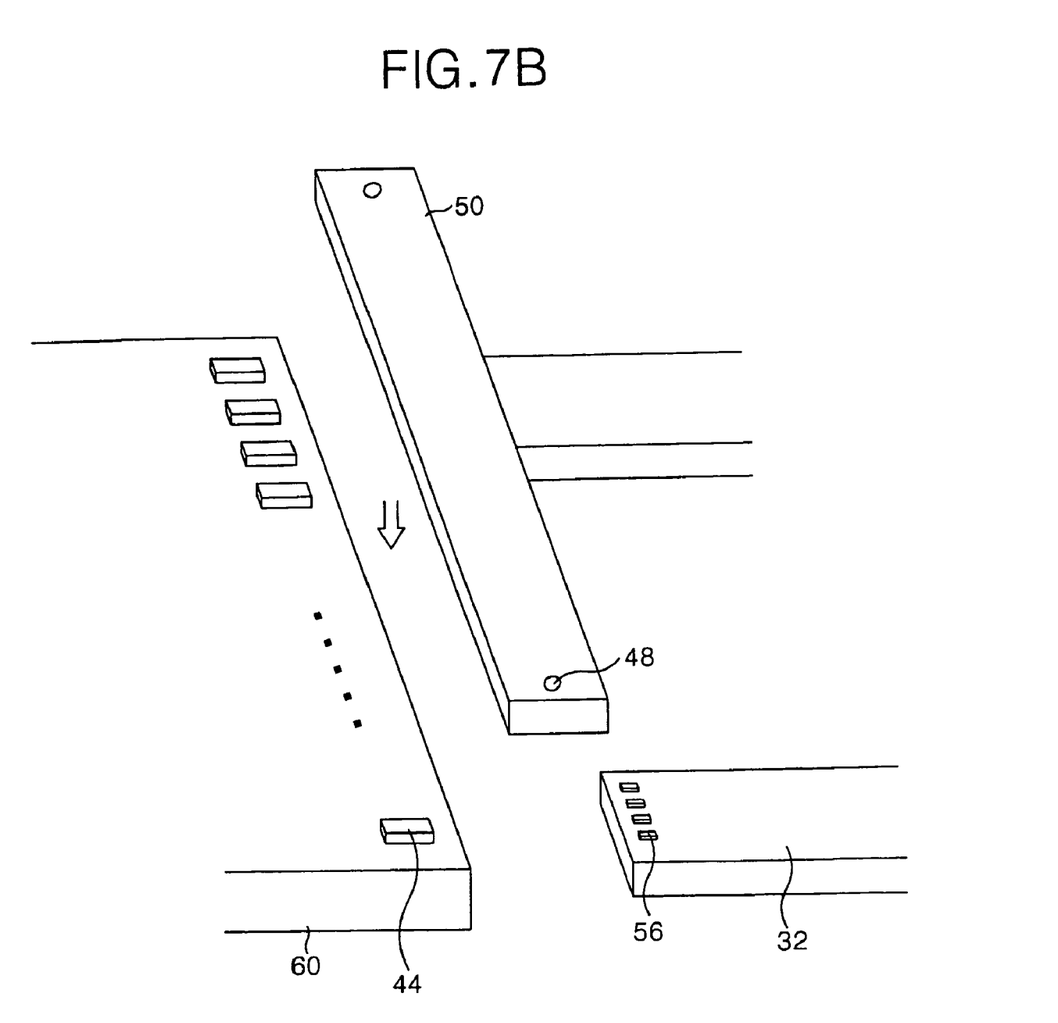
FIG. 7b is a diagram illustrating a contacting process of a connector shown in FIG. 7a with a liquid crystal panel.

In addition, as shown in FIG. 6, the first and the second pads 40 and 42, respectively, in the connector 36 are set up on opposite sides of the connector. However, in an embodiment of the present invention shown in FIGS. 7a and 7b, first and second pads 52 and 54 are formed on the same surface of the connector 50. At this time, the first pad 52 is connected to the TCP pad 56, and the second pad 54 is connected to the pad 44 of the liquid crystal panel 60. At this time, the alignment mark 48 on the connector 50 provides a reference so that the second pad 54 and the pad 44 of the liquid crystal pad 60 may be exactly connected.

Figure 8A:
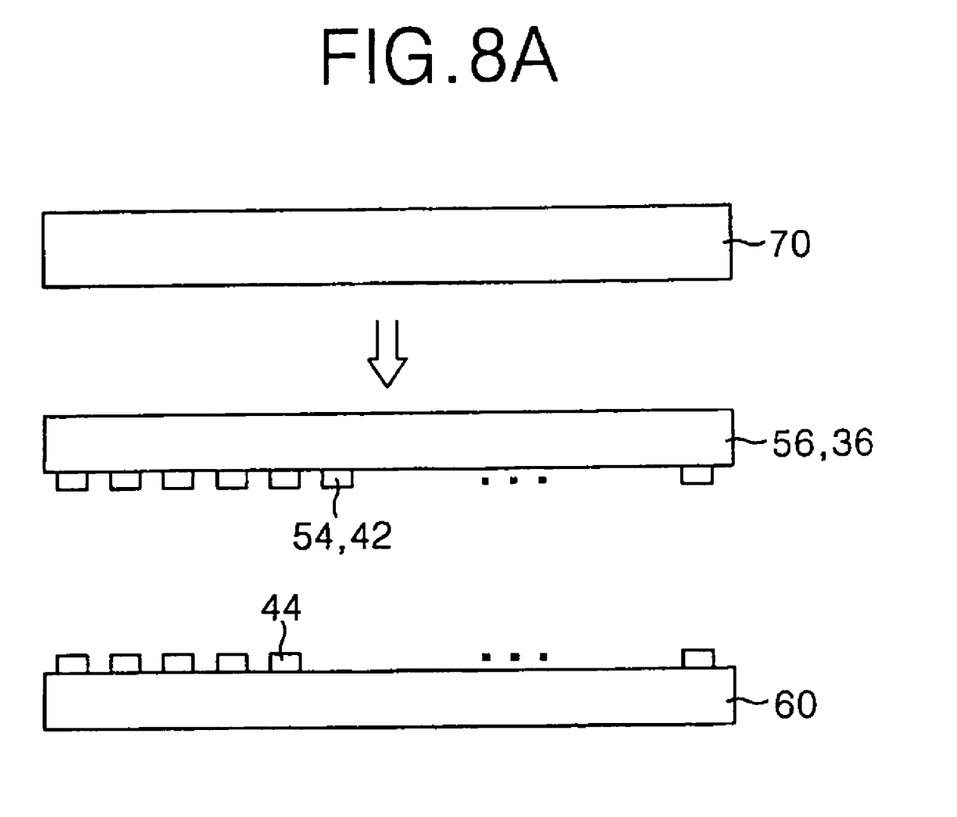
FIGS. 8a and 8b are diagrams illustrating a pressure bar for adhering a connector and a liquid crystal panel.
Figure 8B:
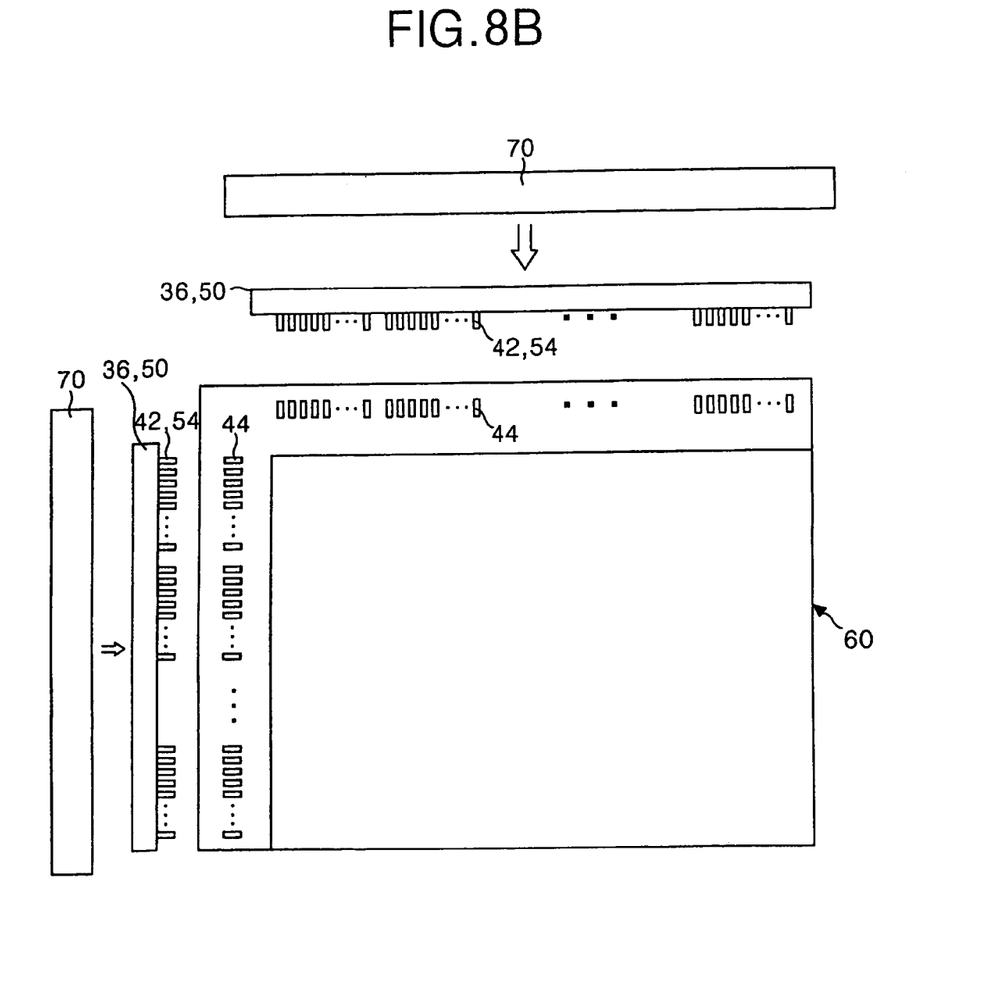

Furthermore, in the present invention, the first pads 40 and 52 of the connector 36 and 50 are connected to the TCP pad 38 and 56. The connectors 36 and 50 are also connected to the TCP 32. Accordingly, the first pads 40 and 52 can be stably connected to the TCPs 38 and 56. However, the second pads 42 and 54 of the connectors 36 and 50 are connected to the pad 44 of the liquid crystal panel 60 only when inspecting the liquid crystal panel 60. Namely, the second pads 42 and 54 cannot be connected to the pad 44 of the liquid crystal panel 60. Accordingly, precise inspection may not be carried out due to bad contact between the second pads 42 and 54 and the pad 44 of the liquid crystal panel 60 during the inspection. In order to solve this problem, a pressure bar 70, which applies a designated pressure on the connectors 36 and 50 when the connectors 36 and 50 and the liquid crystal panel 60 contact each other as shown in FIGS. 8a and 8b, may be provided on the inspecting apparatus 100 of the present invention. The pressure bar 70 applies a designated pressure on the connectors 36 and 50 so that the second pads 42 and 54 and the pad 44 of the liquid crystal panel 60 may be exactly contacted, when the connectors 36 and 50 and the liquid crystal panel 60 are contacted. The pressure bar 70 is set up to have longer length than that of the connectors 36 and 50 so that an uniform pressure is applied in the connectors 36 and 50.

As described above, the liquid crystal panel is inspected by means of setting up the pads in the connector and contacting the pads of this connector and the pads of the liquid crystal panel by using the apparatus for inspecting the liquid crystal panel according to the present invention. In the present invention since the liquid crystal panel and the inspecting apparatus are connected by using the pads and since the liquid crystal panel and the connector are connected by using the alignment mark, the fabrication time can be reduced. Further, any bending generated when connecting by using the pin does not arise. In addition, this invention can accommodate fine pitch more easily than the connector using the pin.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for inspecting a pixel cell disposed in a liquid crystal panel, comprising:
   an integrated circuit board;
   a tape carrier package fixedly connected to the integrated circuit board; and
   a connector having first pads fixedly connected to the tape carrier package and second pads adapted to be connected to at least one of gate pads and data pads of the liquid crystal panel, wherein the connector is removed from the liquid crystal panel after inspecting the liquid crystal panel.

2. The apparatus for inspecting the liquid crystal panel according to claim 1, wherein the connector has a first alignment mark for arranging the liquid crystal panel with the connector so that the second pads connect to liquid crystal pads formed in the liquid crystal panel.

3. The apparatus for inspecting the liquid crystal panel according to claim 2, wherein a second alignment mark is formed in the liquid crystal panel in order to correspond to the first align mark formed in the connector.

4. The apparatus for inspecting the liquid crystal panel according to claim 2, further comprising:
   a pressure bar on the connector for applying a designated pressure to the connector so that the second pads substantially adhere to the liquid crystal pad.

5. The apparatus for inspecting the liquid crystal panel according to claim 1, wherein the first pads are formed on a first surface of the connector, and the second pads are formed on a second surface opposite to the first surface.

6. The apparatus for inspecting the liquid crystal panel according to claim 1, wherein the first and the second pads are formed on a same surface.

7. A method of fabricating a liquid crystal display device, comprising:
   providing first and second substrates;
   providing a liquid crystal material between the first and second substrates;
   attaching the first and second substrates to form a liquid crystal panel;

inspecting the liquid crystal panel to determine whether the liquid crystal panel has any defective pixel using an apparatus that includes an integrated circuit board, a tape carrier package fixedly connected to the integrated circuit board and a connector having first pads fixedly connected to the tape carrier package and second pads adapted to be connected to at least one of gate pads and data pads of the liquid crystal panel; and removing the connector from the liquid crystal panel after said inspecting the liquid crystal panel.

8. The method according to claim 7, wherein the connector has a first alignment mark for arranging the liquid crystal panel with the connector so that the second pads connect to liquid crystal pads formed in the liquid crystal panel.

9. The method according to claim 8, wherein a second alignment mark is formed in the liquid crystal panel in order to correspond to the first align mark formed in the connector.

10. The method according to claim 8, further comprising:
a pressure bar on the connector for applying a designated pressure to the connector so that the second pads substantially adhere to the liquid crystal pad.

11. The method according to claim 8, wherein the first pads are formed on a first surface of the connector, and the second pads are formed on a second surface opposite to the first surface.

12. The method according to claim 7, wherein the first and the second pads are formed on a same surface.

* * * * *